July 25, 1944.   E. E. CARVER   2,354,303
GARDEN SHEARS
Filed Aug. 10, 1943
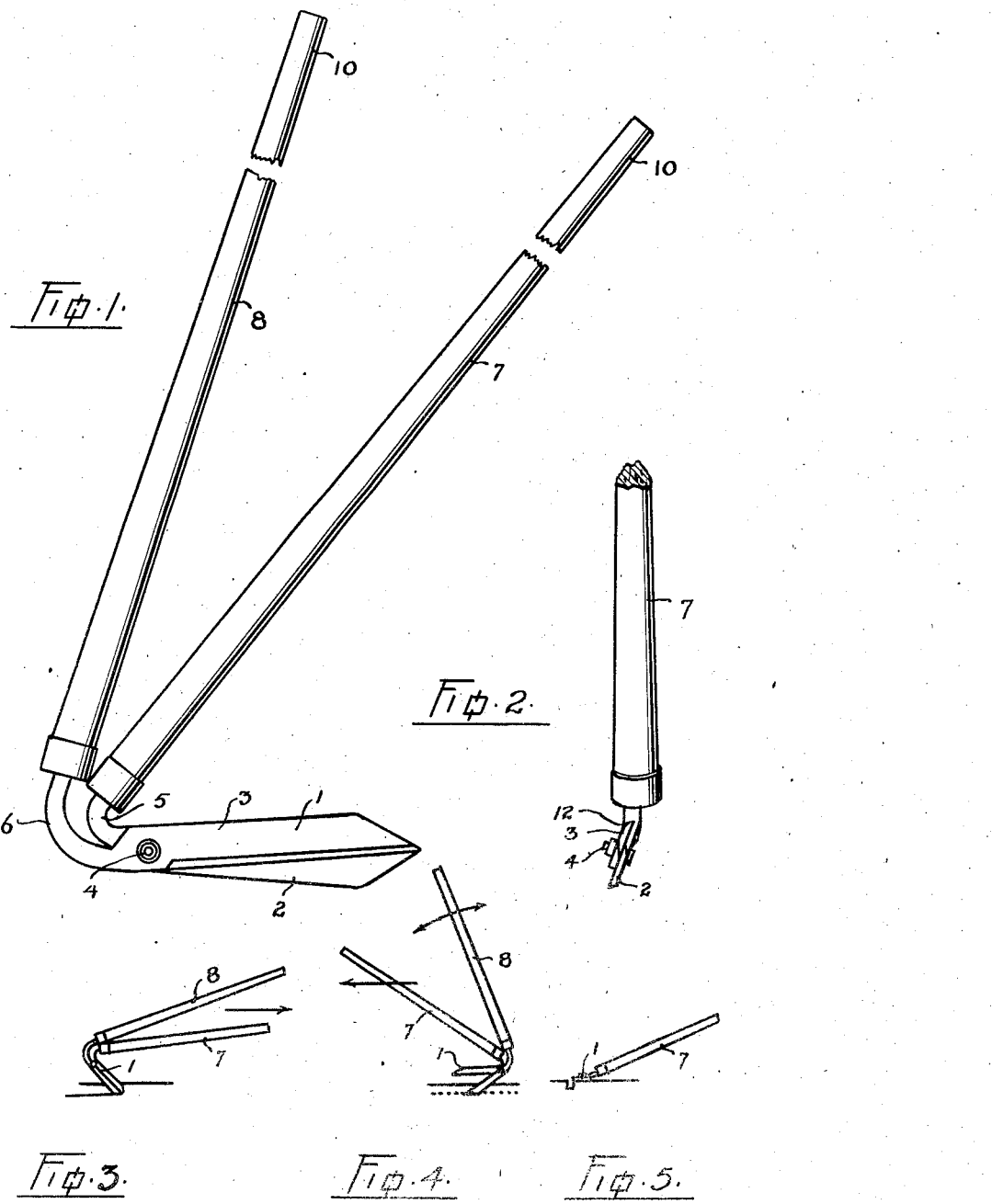
INVENTOR.
Ernest E Carver Patented July 25, 1944

2,354,303

UNITED STATES PATENT OFFICE 2,354,303

GARDEN SHEARS

Ernest E. Carver, Vancouver, British Columbia, Canada

Application August 10, 1943, Serial No. 498,041
In Great Britain September 3, 1942

7 Claims. (Cl. 30—257)

My invention relates to improvements in garden shears which are particularly adapted for use in trimming the borders of lawns adjacent to garden beds and walks.

The invention contemplates a pair of shears capable of trimming lawn borders both vertically and horizontally and also for forming a narrow trench between the lawn and a paved walk or curbing.

A particular object of the invention is to provide a disposition of the several parts of the tool so that its centre of gravity is disposed between the hands of the user, so that there is no wrist strain or fatigue suffered, such as that resulting from the use of the conventional types of long handled shears. Further objects of the tool are to provide a construction in which the shearing elements are drawn towards their work and generally rested upon the ground when being so drawn, so that the weight to be carried is only a proportion of the total weight of the tool, which again lessens the fatigue and permits the user to cut more accurately to a line.

The invention consists of a pair of garden shears having two blades pivotally connected together by a fulcrum pin, a long handle rigidly connected with each blade, the grip of at least one handle being forward of the fulcrum pin as will be more fully described in the following specification and shown in the accompanying drawing, in which—

Fig. 1 is an elevational view of the invention.

Fig. 2 is an elevational view looking at the point of the shears.

Figs. 3, 4 and 5 are diagrammatic views showing the position of the invention when in use for trench forming, cutting a vertical edge, and cutting a horizontal border respectively.

In the drawing like characters of reference indicate corresponding parts in each figure.

The numeral 1 indicates generally a pair of shears consisting of a lower blade 2 and an upper blade 3, which are pivotally connected together by a fulcrum pin 4. The shanks 5 and 6 respectively of the blades 2 and 3 are upwardly and forwardly bent and are fitted with long handles 7 and 8 respectively.

The handle 7 actuating the lower blade 2 is designed to be manipulated by the left hand of the user and the handle 8 by the right hand. Both handles are so disposed by virtue of the bend in the shanks 5 and 6 that their grips or upper parts 10 are forward of the fulcrum pin 4, so that each handle is at an acute angle to the blade to which it is connected. The preferred angle between blade 2 and its handle 7 is substantially 53 degrees and that between blade 3 and its handle 8 is substantially 73 degrees. These two angles may be increased or decreased if the horizontal length of the shanks 5 and 6 are respectively decreased or increased.

With the object of making the device an all purpose tool, the shears 1 are offset from the plane of the handles to an obtuse angle of substantially 158 degrees by bending the shanks 5 and 6 as at 12, see Figure 2.

In operating the tool to cut the vertical edge of a lawn which abuts a paved walk or a curb, the shear 1 is tilted until it assumes a position as shown in Figure 3 and the points of the shear, with the blades closed, is inserted between the lawn and the pavement and drawn as a plow to the right, as indicated by the arrow. This action forms a narrow trench in which the shear may be operated for edge cutting. When edge cutting the point of the lower blade 2 is inserted into the trench, the bottom of which is indicated in dotted line in Figure 4 and the tool is held in the position shown in said figure with the operator facing it. The tool is drawn by the left hand in the direction of the arrow, while the lower blade 2 is resting on the vertical edge of the lawn. The work of cutting is mostly done by moving the handle 8 with the right hand while the left hand is held substantially at rest to draw the tool forwardly as the cutting proceeds. The centre of gravity of the tool when in use in vertical cutting is substantially between the user's hands and is never to the left of the user or in any position where any appreciable wrist strain is developed, consequently any person, though relatively weak, can without fatigue trim the average lawn and do so without stooping and without having to rest during the work.

When the vertical trimming is done, the tool may be set in the position shown in Figure 5 and with the blades parallel to the horizontal edge and the operator facing it. In this case both handles are given approximately the same angular movement to open and close them and a strip of lawn sufficiently wide for the lawn mower wheel can be cut quite rapidly and with ease.

What I claim as my invention is:

1. A pair of garden shears having two blades pivotally connected together by a fulcrum pin, a long handle connected to each blade, the grip of one of said handles being forward of the fulcrum pin.

2. A pair of garden shears having two blades pivotally connected together by a fulcrum pin, a long handle connected to each blade, the grip of both handles being forward of the fulcrum pin.

3. A pair of garden shears having two blades pivotally connected together by a fulcrum pin, a long handle connected to each blade, each of said handles extending at an acute angle to its blade.

4. A pair of garden shears having two blades pivotally connected together by a fulcrum pin, each blade having a shank and a handle for each shank, each of said shanks being bent to project the grip of its handle to a position forward of the fulcrum pin.

5. A pair of garden shears having two blades pivotally connected together by a fulcrum pin, each blade having a shank and a handle for each shank, one of said shanks being bent to project the grip of its handle to a position forward of the fulcrum pin.

6. A pair of garden shears having two blades pivotally connected together by a fulcrum pin, a handle connected to each blade, the grip of one of said handles being forward of the fulcrum pin, the transverse plane of the blades being at an obtuse angle to the plane of the handles.

7. A pair of garden shears having two blades pivotally connected together by a fulcrum pin, a handle connected to each blade, the grip of one of said handles being forward of the fulcrum pin, the transverse plane of the blades being at an obtuse angle to the plane of the handles, said angle being not less than 145 degrees.

ERNEST E. CARVER.